(12) United States Patent
Cho et al.

(10) Patent No.: US 6,496,473 B1
(45) Date of Patent: Dec. 17, 2002

(54) DISC CARTRIDGE WITH MODE SELECTING MEANS

(75) Inventors: Won Hyoung Cho, Seoul (KR); Jong Rak Lim, Kyunggi-do (KR)

(73) Assignee: LG Electronics, Seoul (KR)

( * ) Notice: Subject to any disclaimer, the term of this patent is extended or adjusted under 35 U.S.C. 154(b) by 0 days.

(21) Appl. No.: 09/346,393

(22) Filed: Jul. 1, 1999

(30) Foreign Application Priority Data

Jul. 2, 1998 (KR) .............................................. 98-26684
Jul. 13, 1998 (KR) .............................................. 98-28232

(51) Int. Cl.[7] .............................................. G11B 23/03
(52) U.S. Cl. ..................................................... 369/291
(58) Field of Search ................................ 360/133, 132; 369/77.2, 275.5, 52, 53, 291

(56) References Cited

U.S. PATENT DOCUMENTS

| 5,091,901 A | * | 2/1992 | Yamamato et al. | 369/291 |
|---|---|---|---|---|
| 5,764,622 A | * | 6/1998 | Kawamura et al. | 369/291 |
| 5,805,566 A | * | 9/1998 | Kobayashi | 369/291 |
| 5,991,261 A | * | 11/1999 | Maeda et al. | 369/291 |
| 6,002,557 A | * | 12/1999 | Tanaka | 360/133 |
| 6,078,563 A | * | 6/2000 | Goto et al. | 369/291 |
| 6,091,563 A | * | 7/2000 | Thomas et al. | 360/69 |
| 6,125,011 A | * | 9/2000 | Ikeba | 360/133 |

FOREIGN PATENT DOCUMENTS

| KR | 908970 | 5/1990 |
|---|---|---|
| KR | 9017022 | 11/1990 |

* cited by examiner

*Primary Examiner*—Hoa T. Nguyen
*Assistant Examiner*—Tianjie Chen
(74) *Attorney, Agent, or Firm*—Birch, Stewart Kolasch & Birch, LLP

(57) ABSTRACT

A disc cartridge that can provide various driving modes for a disc received within the cartridge and allows a user to select the driving modes efficiently. A disc recording/reproducing method and apparatus employing the disc cartridge is disclosed. In the disc cartridge, a recording prohibition mode, a verification preceding recording mode and a direct recording mode are used. A mode selector can select each mode. The disc cartridge can provide various driving modes at a user's request and permits a user to select the driving modes efficiently by a single selector.

21 Claims, 14 Drawing Sheets

FIG.2
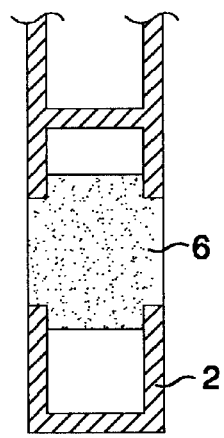
FIG.3
RECORDING PROHIBITION MODE
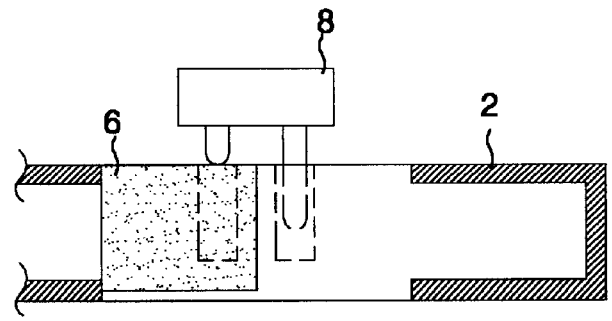
VERIFICATION PRECEDING RECORDING MODE
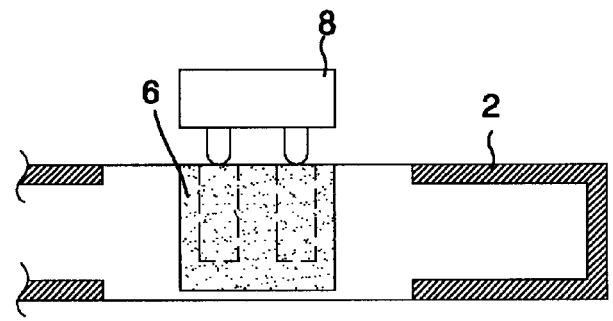
DIRECT RECORDING MODE
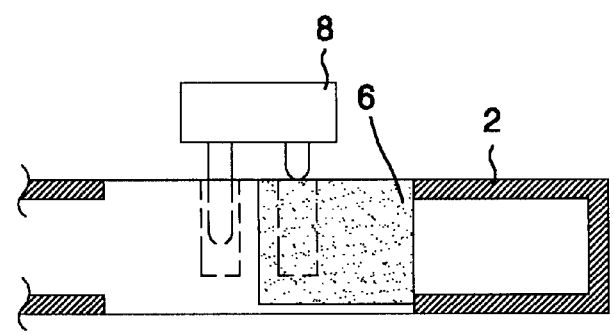

FIG.9
○ :CLOSE
◯ :OPEN
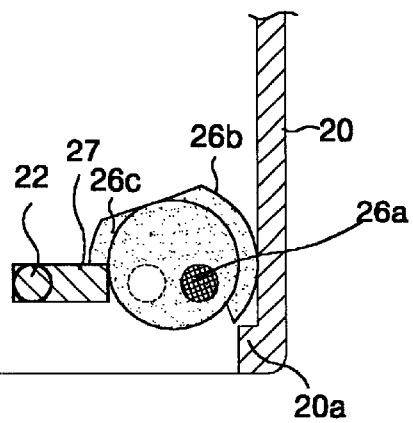
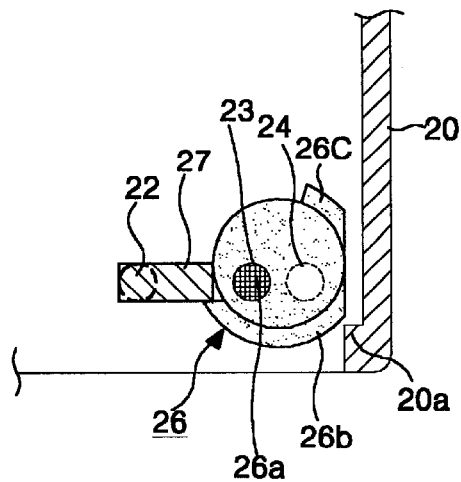
DIRECT RECORDING MODE    RECORDING PROHIBITION MODE

FIG.11
○ : CLOSE
○ : OPEN
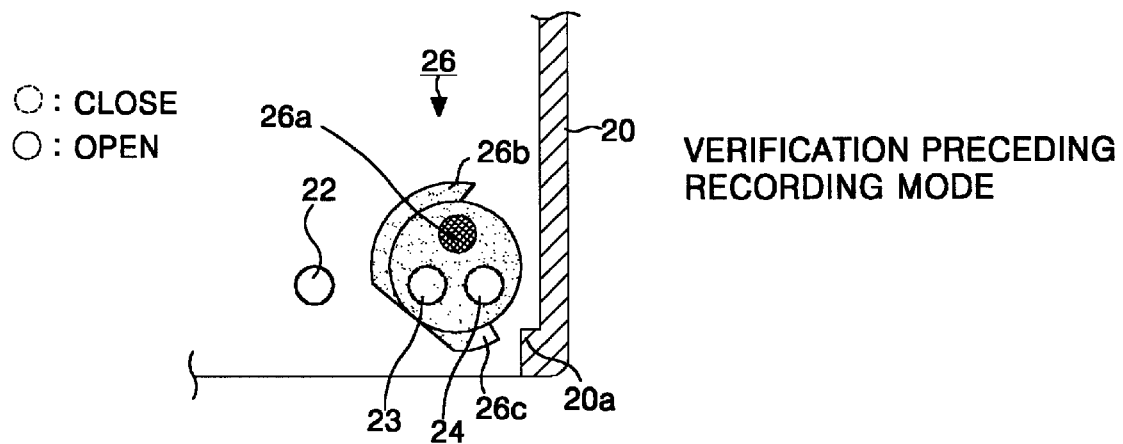
VERIFICATION PRECEDING RECORDING MODE
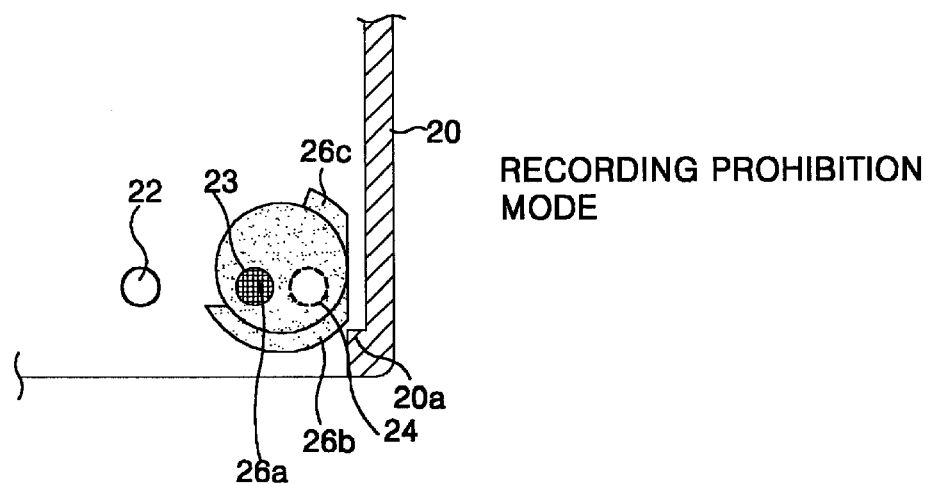
RECORDING PROHIBITION MODE
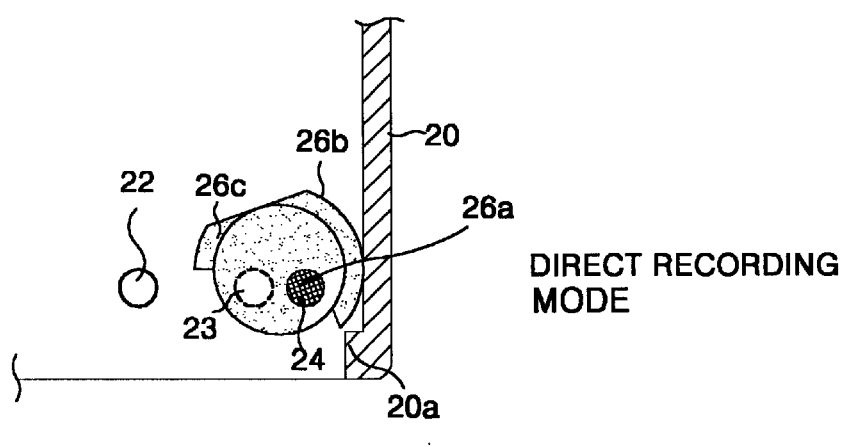
DIRECT RECORDING MODE

DISC CARTRIDGE WITH MODE SELECTING MEANS

BACKGROUND OF THE INVENTION

1. Field of the Invention

This invention relates to a disc cartridge, and more particularly to a disc cartridge that is capable of providing various driving modes for a disc received within the cartridge and selecting the driving modes efficiently. Also, the present invention is directed to a disc recording/reproducing method and apparatus making use of the disc cartridge providing various recording modes.

2. Description of the Related Art

Generally, a disc is classified as a read-only type disc such as CD-ROM and DVD-ROM, etc., a WORM(write once read many) type disc such as CD-R and DVD-R, etc., and a rewritable disc such as CD-RW, DVD-RAM and optical magnetic disc, etc. The read-only type disc in such discs has been usually propagated in a shape of bare disc. On the other hand, the rewritable disc has been received within the cartridge for the purpose of protecting an information recording face from contamination or impact. This is a concern since the information recording face of the rewritable disc is subject to be contaminated and damaged by fingerprints, dust, scratches and so forth. When an information is recorded or reproduced to or from a disc received within such a disc cartridge, a disc driver moves a shutter provided in the cartridge to expose an opening, thereby assuring access to the disc.

Nowadays, there has been suggested an open-close structure by which a disc can be removed from its cartridge, so as to meet various needs of a user. Accordingly, a disc cartridge may be classified into a sealed type and an open-close type depending on whether it can be opened and closed. The open-close type cartridge has a structure that enables a user to insert or release a disc. In this case, when a disc has been released from the cartridge, a defect area caused by an external contamination or impact may occur on the information recording face of the disc, so that an error occurs at the time of recording or reproducing an information. More specifically, a user is usually intended to compatibly drive a disc by a disc driver having a different driving condition, that is, a disc driver installed to a portable information equipment or a stationary information equipment. For instance, an information can be recorded onto a disc received within a cartridge by a first disc driver installed to a camcorder and an information can be reproduced and edited from the disc by a second disc driver installed to the stationary information equipment. In this case, since the second disc driver can be loaded only in a state of bare disc when it corresponds to a read-only type disc driver, a user must take the disc from the cartridge and load it into the second disc driver. However, since a disc may be contaminated or damaged when it has been released into the outside of a cartridge at a user's request, an error can occur at the time of recording or reproducing an information to or from the disc having a release experience. In order to prevent this, it is necessary to for the disc driver to confirm a release experience of the disc, that is, an opened and closed experience of the cartridge at the time of recording or reproducing to or from the disc received within the open-close type cartridge and to precede a verifying operation for the purpose of assuring an information responsibility when the disc has a release experience. Accordingly, the disc cartridge is usually provided with a hole for confirming the opened and closed experience of the cartridge. Also, the disc cartridge is provided with a number of functional holes including a functional hole for indicating a recording prohibition.

The disc driver is mounted with a sensor for sensing a disc state depending on whether or not there has been an opening and closing of the functional holes provided in the cartridge. In other words, when a disc cartridge is loaded, the disc driver senses an opening and closing of the functional holes provided in the disc cartridge by means of the sensor and judges a driving mode of a disc received within the disc cartridge. For instance, when it is sensed by the sensor that the opened and closed experience confirming hole of the loaded disc cartridge is opened, since a disc received within the cartridge has been released from the cartridge at least once, the disc driver regards as a contamination or a damage of the disc to operate a drive mode preceding a verification operation for the disc.

However, the disc verification process has a disadvantage in that, although it is requisite for an assurance of information responsibility, it requires more time than a usual recording process. In other words, a case where a recording process is performed after a verification process for the disc was preceded requires twice the time when compared with a case where a recording process is just performed without a verification process, which is hereinafter referred to as "direct recording mode". In particular, even when a user receives a bare disc released from the disc cartridge again within the cartridge after polishing an information recording face thereof, the disc driver precedes a verification process for the disc because the opened and closed experience confirming hole is in a state of being opened. In this case, a problem exists in that a user wastes the time associated with an unnecessary verification process. This is caused by a fact that a conventional cartridge fails to allow a user to perform a recording process directly without a verification process for a disc having a release experience. As described above, the functional holes configuration installed in a conventional disc cartridge has a drawback in that it provides only a limited function. Also, the conventional cartridge has a problem in that a user may be confused by the co-existence of a number of functional holes.

SUMMARY OF THE INVENTION

Accordingly, it is an object of the present invention to provide a disc cartridge that is capable of providing various drive modes for a disc and permits a user to select from among the drive modes efficiently.

A further object of the present invention is to provide a disc cartridge wherein an opening or closing of functional holes indicating various drive mode can be selected by a single selecting device.

A still further object of the present invention is to provide a disc cartridge wherein a recording prohibition mode and a direct recording mode only are applied when a disc does not have a release experience while a verification preceding recording mode can be selected by a user when a disc has a release experience, thereby preventing a user's error in advance.

A still further object of the present invention is to provide a disc recording/reproducing method and apparatus for performing recording and reproducing operations for a disc making use of a disc cartridge providing various operation modes.

In order to achieve these and other objects of the invention, a disc cartridge according to one aspect of the present invention has mode selecting means for selecting any one of a recording prohibition mode, a verification preceding recording mode and a direct recording mode.

A disc recording/reproducing method according to another aspect of the present invention includes the steps of confirming a current mode when a disc cartridge including a recording prohibition mode, a verification preceding recording mode and a direct recording mode is loaded; and driving a disc received within the disc cartridge in accordance with a mode confirmed in the confirming step.

A disc recording/reproducing apparatus according to still another aspect of the present invention includes sensing means for sensing a current mode when a disc cartridge including a recording prohibition mode, a verification preceding recording mode and a direct recording mode is loaded; recording/reproducing means for performing a recording and reproducing operation of the disc received within the disc cartridge; mode discriminating means for judging a disc driving mode in accordance with a sensing signal inputted from the sensing means; and control means for controlling the recording/reproducing means in a driving mode determined at the mode discriminating means.

BRIEF DESCRIPTION OF THE DRAWINGS

These and other objects of the invention will be apparent from the following detailed description of the embodiments of the present invention with reference to the accompanying drawings, in which:

FIG. 2 is a sectional view of the slider in FIG. 1 taken along B–B' line;

FIG. 3 is sectional views for showing a recording mode change process when using the slider in FIG. 1;

FIG. 9 shows an operation of the rotationally driving slider according to a recording mode when a disc has not been released from the disc cartridge in FIG. 6;

FIG. 11 shows an operation of the rotationally driving slider according to a recording mode when a disc has been released from the disc cartridge in FIG. 6;

DETAILED DESCRIPTION OF THE PREFERRED EMBODIMENT

Figure 1:
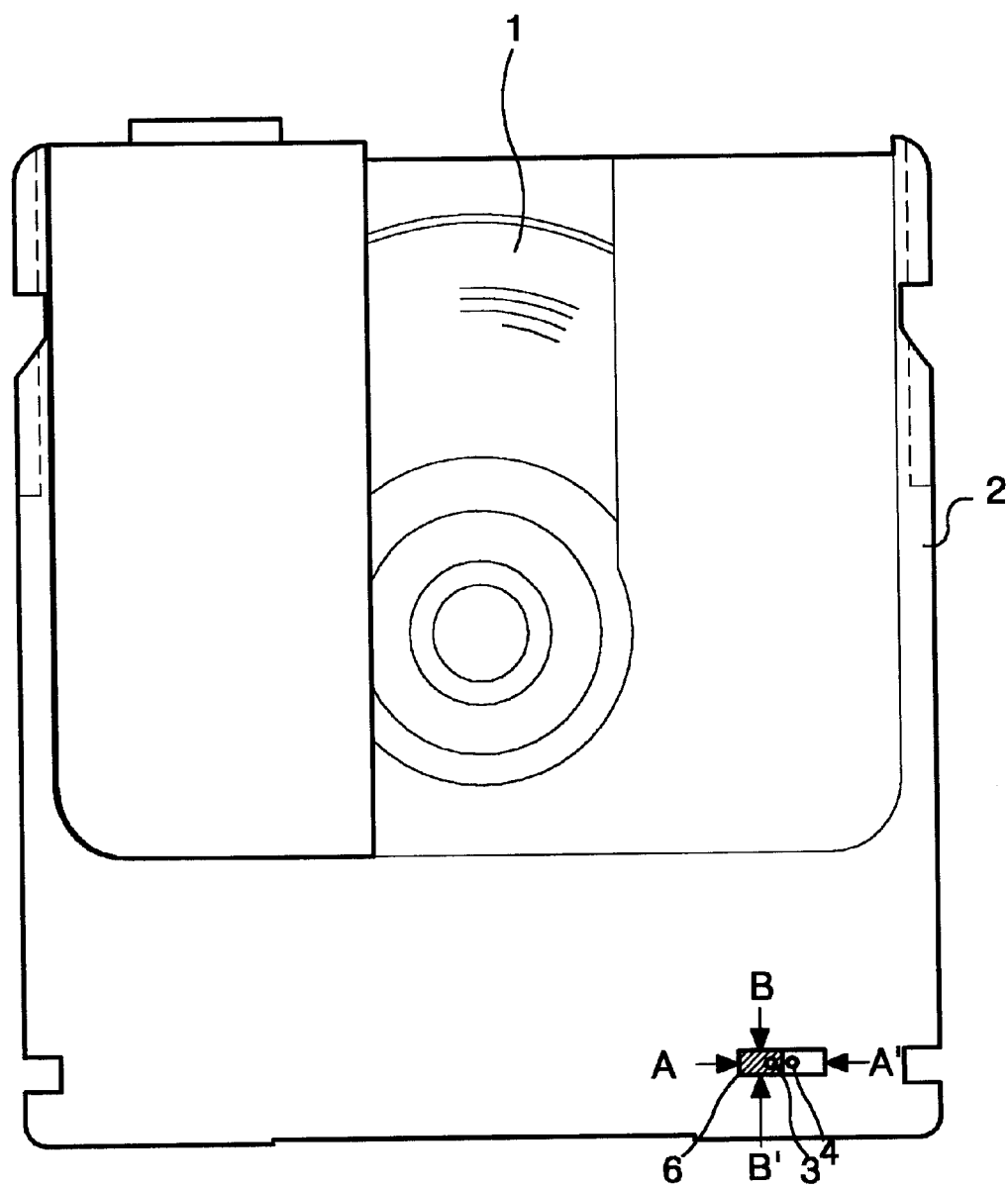
FIG. 1 is a plan view showing the structure of a disc cartridge according to a first embodiment of the present invention.

Referring to FIG. 1, there is shown a disc cartridge according to a first embodiment of the present invention. The disc cartridge includes a cartridge body 2 with a disc 1, a verification confirming hole 3 and a recording confirming hole 4 defined in the cartridge body, and a slider 6 for opening and closing the verification confirming hole 3 and the recording confirming hole 4.

In the disc cartridge shown in FIG. 1, the cartridge body 2 is provided with an opening such that an optical pickup can access the disc 1. This opening is opened and closed by movement of a shutter 7.

The verification confirming hole 3 allows a disc driver to judge whether a verification of the disc has occurred. The verification confirming hole 3 is opened and closed depending on a release experience of the disc or a selection of a user. The recording confirming hole 4 allows a disc driver to judge whether or not recording on the disc 1 is prohibited. The recording confirming hole 4 is opened and closed by selection of the user. Verification confirming hole 3 and recording confirming hole 4 are formed adjacently to the cartridge body 2. As shown in FIG. 2, the slider 6 is mounted to the cartridge body 2 in such a manner as to be driven linearly, thereby opening and closing the verification confirming hole 3 and the recording confirming hole 4. In this case, the slider 6 is provided with a protrusion or recess so that a user can manually position it.

Such a disc cartridge shows three driving modes, i.e., a recording prohibition mode, a verification preceding recording mode and a direct recording mode depending on the verification confirming hole 3 and the recording confirming hole 4. Herein, the recording prohibition mode means a mode in which it is impossible to record information on the disc 1, that is, a read-only mode. The verification preceding mode means a mode in which a recording is possible after performing a verification process on the disc 1. The direct recording mode means a mode in which a direct recording is possible without a preliminary verification process. In other words, the recording prohibition mode is a mode in which a disc driver permits information on the disc 1 to be reproduced like a read-only disc when the disc 1 received within the disc cartridge is contaminated or damaged or when a user intends to protect important data. The direct recording mode is a mode in which a disc driver permits the disc 1 to be recorded on without a verification process when the disc 1 does not experience a release from the cartridge body 2. The direct recording mode is a mode in which a disc driver permits recording of information on the disc 1 directly when a user does not want a verification process although the disc 1 may experience a release from the cartridge body 2.

The disc driver determines the three modes depending on whether the verification confirming hole 3 and the recording confirmation hole 4 in the loaded disc cartridge are opened or closed. A driving mode of the disc 1 according to the opened or closed state of the functional holes 3 and 4 is indicated in the following table.

TABLE 1

|  | VERIFICATION CONFIRMING HOLE | RECORDING CONFIRMING HOLE |
|---|---|---|
| RECORDING PROHIBITION MODE | OPEN/CLOSE | OPEN |
| VERIFICATION PRECEDING RECORDING MODE | CLOSE | CLOSE |
| DIRECT RECORDING MODE | OPEN | CLOSE |

In Table 1, an opened state of the recording confirming hole 4 provided in the disc cartridge represents a recording prohibition mode irrespectively of whether the verification confirming hole 3 is opened or closed. Otherwise, the closed state of the recording confirming hole 4 represents a verification preceding recording mode or a direct recording mode depending on whether the verification confirming hole 3 is opened or closed. More specifically, a state in which both of the recording confirming hole 4 and the verification confirming hole 3 are closed, represents a verification preceding mode. On the other hand, a state in which the recording confirming hole 4 is closed and the verification confirming hole is opened, represents a direct recording mode.

FIG. 3 is a sectional view of the cartridge body 2 taken along A–A' line in FIG. 1, and which represents a opened and closed state of the verification confirming hole 3 and the recording confirming hole 4 corresponding to each driving mode of the disc driver.

In FIG. 3, a switch 8 is mounted to the disc driver, and which is located in opposition to the verification confirming hole 3 and the recording confirming hole 4 provided in the cartridge body 2 to sense an opened and closed state of the functional holes 3 and 4. This switch 8 may be replaced by a sensor capable of sensing the opened and closed state of the functional holes 3 and 4, for example, a photo sensor. The disc driver senses the opened and closed state of the functional holes 3 and 4 through the switch 8 to judge a driving mode. When the slider 6 is positioned at the left side thereof, the verification confirming hole 3 is closed while the recording confirming hole 4 is opened. In this case, the switch 8 senses a state in which only the recording confirming hole 4 is opened, and outputs a sensing signal to a microcomputer (not shown) provided in the disc driver. The microcomputer determines a recording prohibition mode by the sensing signal inputted from the switch 8. The microcomputer informs a user by a message or an alarm that a recording is impossible, and prevents a recording processor (not shown) from being driven. Otherwise, when the slider 6 located at the middle position, both the verification confirming hole 3 and the recording confirming hole 4 are closed. In this case, the switch 8 senses a state in which all the functional holes 3 and 4 are closed, thereby outputting a sensing signal to the microcomputer. The microcomputer determines a verification preceding recording mode by a sensing signal inputted from the switch 8 and allows a recording operation to be performed after a verification operation. On the other hand, when the slider 6 is positioned at the right side thereof, the verification confirming hole 3 is opened and the recording confirming hole 4 is closed. In this case, the switch 8 senses the opened or closed state of the functional holes 3 and 4 to output a sensing signal to the microcomputer. The microcomputer determines a direct recording mode by the sensing signal inputted from the switch 8 to perform a recording operation directly without a verification process of the disc 1. As described above, the disc cartridge according to the present invention allows a user to control the opened or closed state of the verification confirming hole 3 and the recording confirming hole 4 through the slider 6, thereby efficiently selecting a driving mode.

Figure 4:
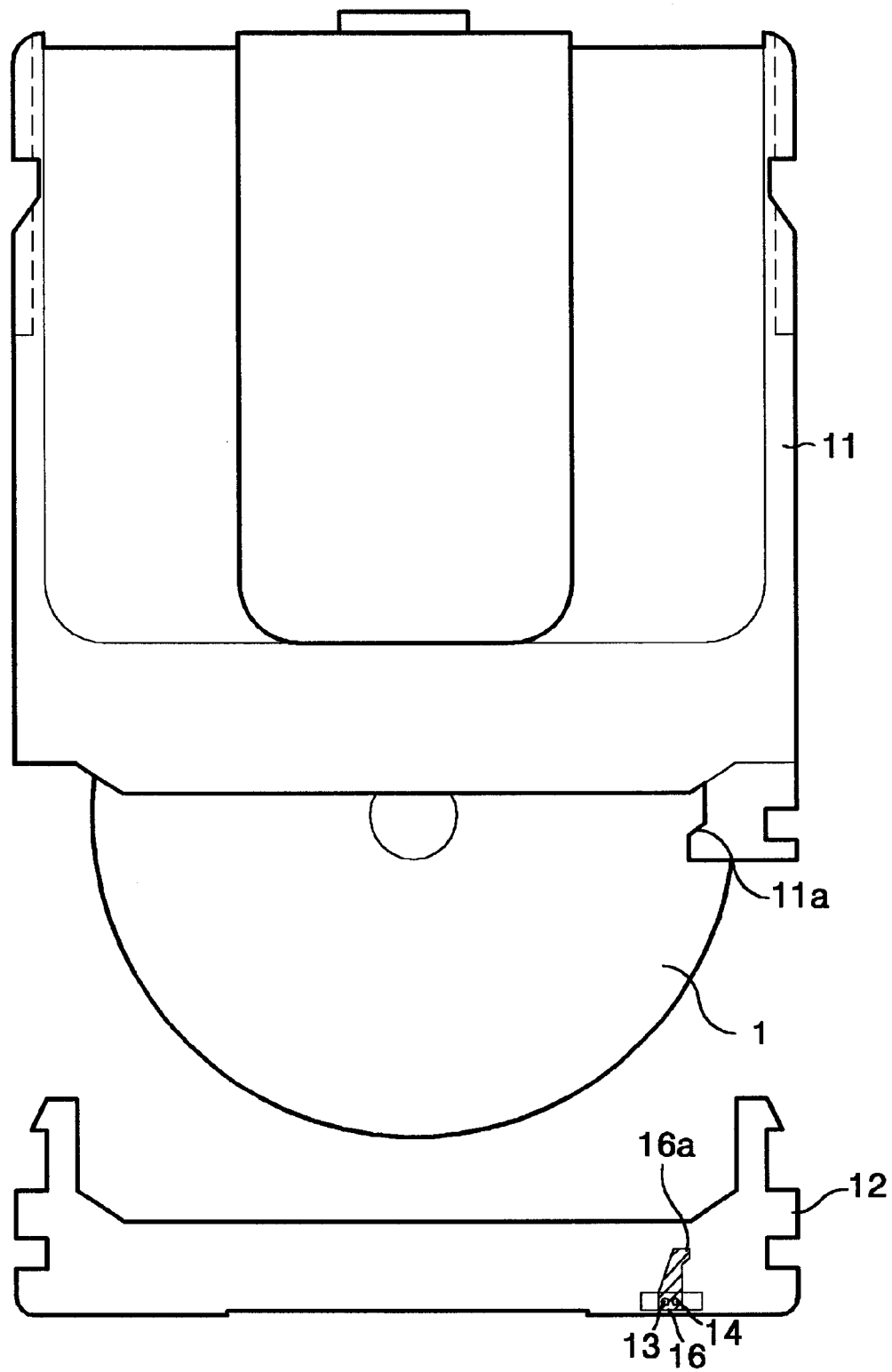
FIG. 4 is a plan view showing the structure of a disc cartridge according to a second embodiment of the present invention.

Referring to FIG. 4, there is shown a disc cartridge according to a second embodiment of the present invention. The disc cartridge includes a cartridge body 11 with a slope 11a for receiving a disc 1, a holder 12 for mounting to the cartridge body 11 in such a manner to be inserted and released, a verification confirming hole 13 and a recording confirming hole 14 defined in the holder 12, and a slider 16 provided with a protrusion 16a having a slope corresponding to the slope 11a.

In the disc cartridge shown in FIG. 4, at the bottom of the cartridge body 11 an inserting hole is defined such that the disc 1 can be inserted therein. A holder is mounted in opposition to the inserting hole in such a manner to be inserted and released by a user. The verification confirming hole 13 and the recording confirming hole 14 allows a disc driver to determine a recording prohibition mode, a verification preceding recording mode or a direct recording mode depending on whether they are opened or closed as mentioned above. The functional holes 13 and 14 are opened or closed by means of the slider 16. The slider 16 is mounted to the holder 12 such that it can be linearly driven by a user. Also, the slider 16 allows the verification confirming hole 13 to be maintained in a closed state when the holder 12 (or more specifically the disc) has a release experience. In this case, protrusion 16a formed in the slider 16 and slope 11a formed in the cartridge body 11 serve to guide the slider 16 to shut the verification confirming hole 13 and the recording confirming hole 14 at the time of release of the holder 12. The purpose of this operation is to provide for a verification preceding mode when the disc 1 has a release experience from the cartridge. Also, when a user does not want a verification process for a disc having a release experience, he drives the slider 16 to open the verification confirming hole 13. In other words, when a verification process is not needed because the disc 1 is not contaminated, the verification confirming hole 13 can be set in an opened state by a user. If such a disc cartridge is loaded, then the disc driver recognizes a state in which the verification confirming hole 13 is opened and the recording confirming hole 14 is closed, thereby setting a direct recording mode. As a result, the disc cartridge according to the present invention allows a recording operation to be performed directly without performing a verification process.

Figure 5A:
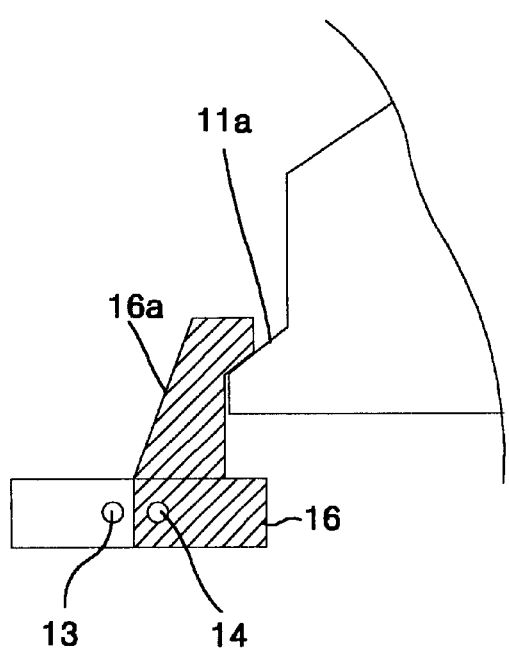
FIG. 5 shows an operation procedure of the slider in FIG. 4.
Figure 5B:
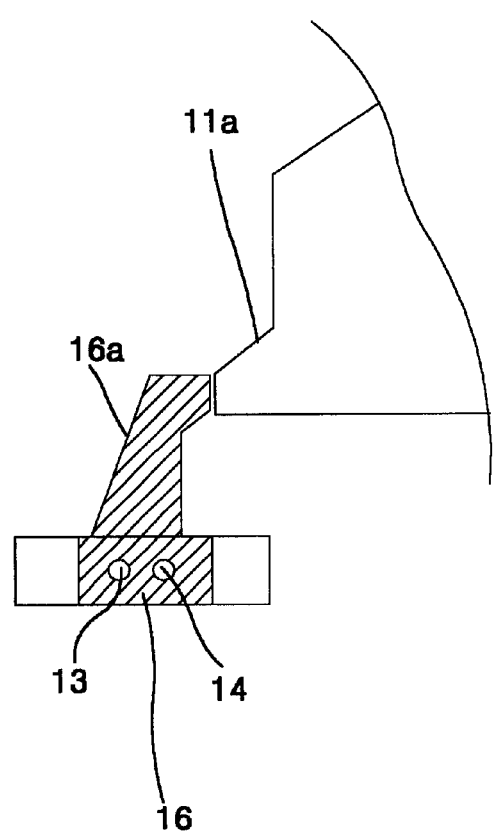

FIG. 5A and FIG. 5B shows movement of the slider 16 upon release of the holder 12. FIG. 5A shows a case in which the holder 12 does not have a released experience from the cartridge body 11. In FIG. 5A, the slider 16 is located at the right side thereof to keep a state where the verification confirming hole 13 is opened and the recording confirming hole 14 is closed. If such a disc cartridge is loaded, then the disc driver is set to a direct recording mode that permits a recording of information on the disc directly without a verification process. It is desirable that the slider 16 is set to a state corresponding to the direct recording mode as shown in FIG. 5A because there is a small possiblity that the disc 1 may be contaminated or damaged. FIG. 5B shows a case where the holder 12 is released from the cartridge body 11. In FIG. 5B, the protrusion 16a of the slider 16 is moved to the left along the slope 11a of the cartridge body 11. Accordingly, the slider 16 also is moved to the left to shut both the verification confirming hole 13 and the recording confirming hole 14. A closed state of the functional holes 13 and 14 is maintained even if the released disc 1 is received again and the holder is mounted again, so that it allows a disc driver to sense a release experience to thereby be set to a verification preceding recording mode. In this case, if a user does not want a verification process, the slider 16 may be moved to the right to open the verification confirming hole 13 and to close the recording confirming hole 14. If a disc cartridge in which the verification confirming hole 13 is opened while the recording confirming hole 14 is closed is loaded, then the disc driver senses the opened or closed state of the functional holes 13 and 14 to be set to a direct recording mode. When the slider 16 is pushed into the left edge, the first disc driver can record information on the corresponding disc 1 in the directing recording mode. On the other hand, when the holder 12 is released from the cartridge body 11 when the slider 16 is located at the left side or the middle position, the location of the slider 16 does not change because the protrusion 16a of the slider 16 is free from the slope 11a of the cartridge body 11. In this case, the disc driver also is operated in an operation mode in a state prior to a release of the holder 12, that is, in a recording prohibition mode or a direct recording mode.

Figure 6:
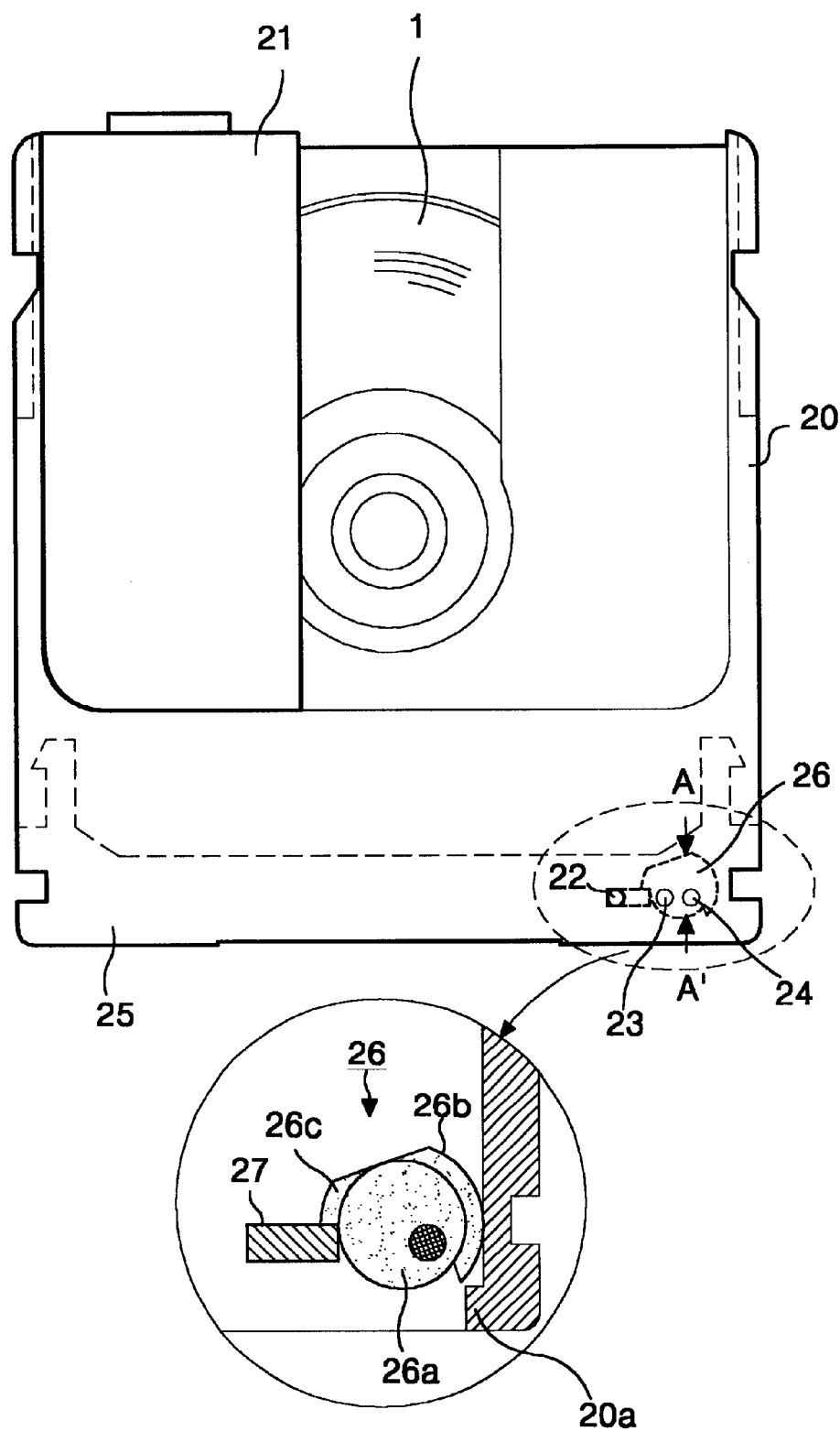
FIG. 6 is a plan view showing the structure of a disc cartridge according to a third embodiment of the present invention.

Referring to FIG. 6, there is shown a disc cartridge according to a third embodiment of the present invention. The disc cartridge includes a cartridge body 20 for receiving a disc 1, an open-close confirming hole 22, a recording confirming hole 23 and a verification confirming hole 24 for indicating a recording mode, a holder 25 mounted to the cartridge body 20 in such a manner to be inserted and released, and a rotary slider 26 installed to the holder 25 in such a manner to be rotatively driven.

In the disc cartridge shown in FIG. 6, at the bottom of the cartridge body 20 an inserting hole is defined such that the disc 1 can be inserted therein. The holder 25 is mounted in opposition to the inserting hole in such a manner to be inserted and released by a user. The open-close confirming hole 22 indicates whether the cartridge has been opened or closed, that is, whether or not the disc 1 has a release experience. The recording confirming hole 23 indicates whether or not a recording of information on the disc 1 is prohibited, and the verification confirming hole 24 indicates whether a verification has been performed. Functional holes 22, 23 and 24 allow the disc driver to judge the driving mode of the disc 1. The three functional holes 22, 23 and 24 are formed in parallel on one side of the cartridge body 20. A stopper 27 is installed to the holder 25 in opposition to the open-close confirming hole 22 to open or close the open-close confirming hole 22 in accordance with whether or not the disc 1 has a release experience. Also, the stopper 27 is responsible for limiting rotation of the rotary slider 26 when the disc 1 does not have any release experience. The rotary slider 26 is installed in the holder 26 in such a manner to be rotatably driven to selectively open and close the recording confirming hole 23 and the verification confirming hole 24. At the front side of the rotary slider 26, an annular hole 26a for opening the recording confirming hole 23 or the verification confirming hole 24 is defined. First and second blades 26b and 26c as shown within a circle in FIG. 6 are formed at the outer circumference of the rotary slider 26.

The first blade 26b contacts the stopper 27 upon rotation of the rotary slider 26 when the disc 1 does not have a release experience to thereby limit the clockwise pivot range of the rotary slider 26. Also, the first blade 26b contacts a jaw 20a of the cartridge body 20 when the holder 25 is released, thereby rotating the rotary slider 26 in a counterclockwise direction. Accordingly, when the holder 25 has a release experience, the recording confirming hole 23 and the verification confirming hole 24 are automatically closed by rotation of the rotary slider 26. The second blade 26c contacts the stopper 27 when the disc 1 does not have any release experience, thereby driving the rotary slider 26 in a clockwise direction.

Figure 7A:
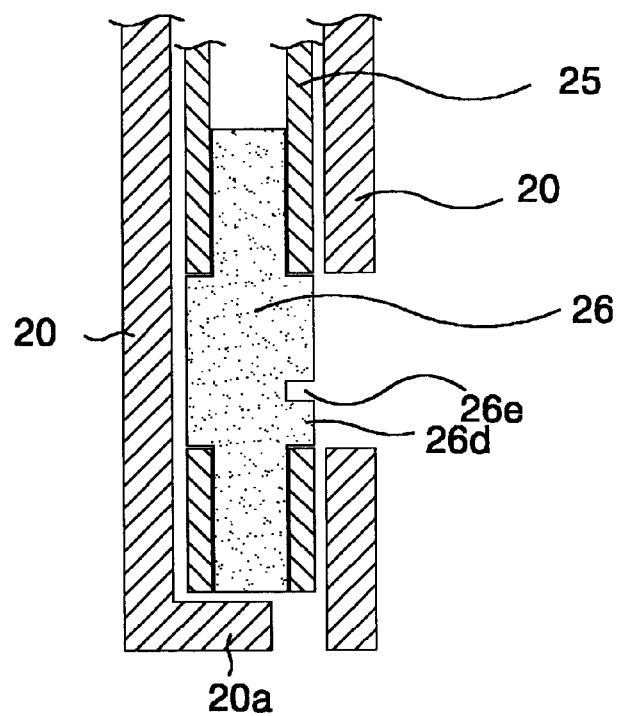
FIG. 7A is a sectional view of a portion at which the rotationally driving slider is positioned taken along A–A' line in FIG. 6.
Figure 7B:
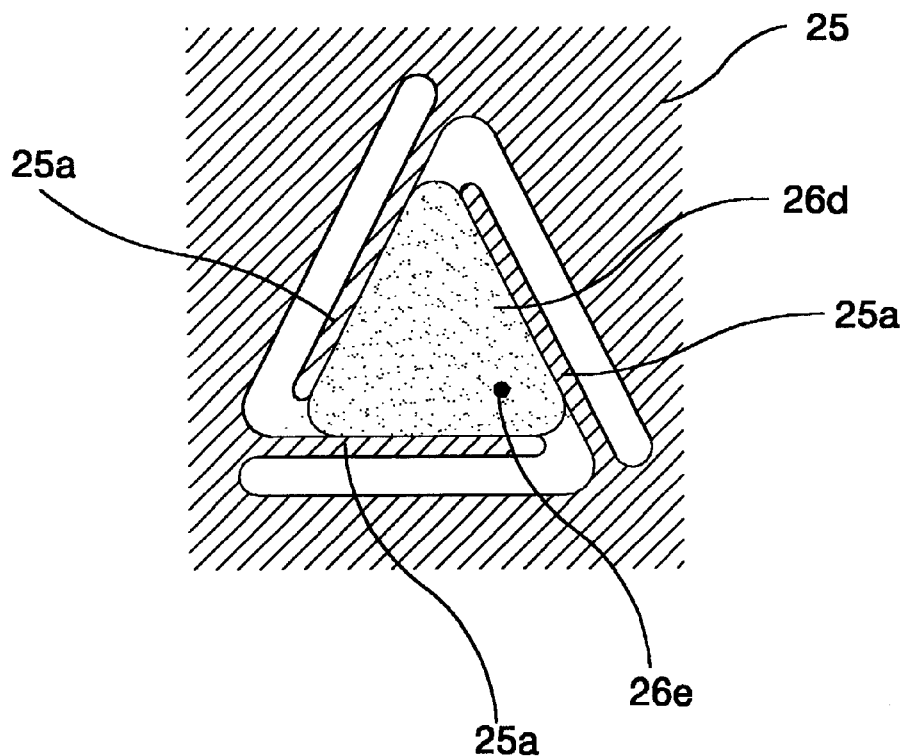
FIG. 7B is a rear view of the rotationally driving slider.
Figure 8:
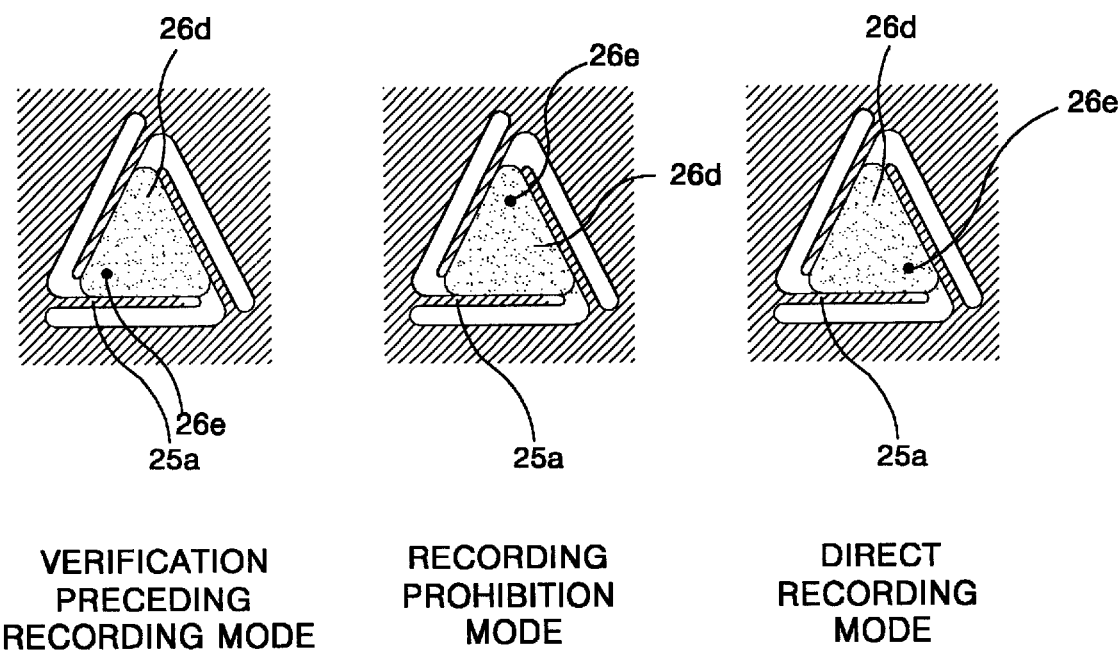
FIG. 8 represents a process in which the triangle click in FIG. 7B is transformed in accordance with a recording mode.

The rotary slider 26 is mounted by penetrating the holder 25 as shown in FIG. 7A. As shown in FIG. 7A and FIG. 7B, a triangle click 26d is formed in the rotary slider 26. At the rear side of the holder 25, a triangular shaped hole for inserting the triangle click 26d is provided. Elastic protrusions 25a assist in holding the triangle click 26d. The triangle click 26d and the elastic protrusions 25a control the position of the annular hole 26a in such a manner so that it opposes the recording confirming hole 23 or the verification confirming hole 24. A user adjusting recess 26e is defined at the rear side of the triangle click 26d. A user can drive the rotary slider 26 by inserting and rotating a sharp-pointed material into the user adjusting recess 26e. In other words, as shown in FIG. 8, a user rotates the rotary slider 26 making use of the user adjusting recess 26e to open or close the recording confirming hole 23 and the verification confirming hole 24, thereby selecting a verification preceding recording mode, a recording prohibition mode or a direct recording mode.

In this case, a driving mode of the disc can be indicated in accordance with the opened or closed state of the open-close confirming hole 22, the recording confirming hole 23 and the verification confirming hole 24 as described in the following table:

TABLE 2

| | RECORDING CONFIRMING HOLE | VERIFICATION CONFIRMING HOLE | OPEN-CLOSE CONFIRMING HOLE |
|---|---|---|---|
| RECORDING PROHIBITION MODE | OPEN | CLOSE | CLOSE |
| DIRECT RECORDING MODE | CLOSE | OPEN | |
| RECORDING PROHIBITION MODE | OPEN | CLOSE | OPEN |
| VERIFICATION PRECEDING RECORDING MODE | CLOSE | CLOSE | |
| DIRECT RECORDING MODE | CLOSE | OPEN | |

In Table 2, when the open-close confirming hole 22 is closed, the recording confirming hole 23 is opened and the verification confirming hole 24 is closed, represents a recording prohibition mode. When the open-close confirming hole 22 is closed, the recording confirming hole is closed and the verification confirming hole is opened, represents a direct recording mode. Meanwhile, when the open-close confirming hole 22 is opened, a recording prohibition mode is indicated by the recording confirmation hole 23 being open and the verification confirming hole 24 being closed. When the open-close confirming hole 22 is opened and both the recording confirming hole 23 and the verification confirming hole 24 are closed, represents a verification preceding recording mode. Finally, if the open-close confirming hole 22 is open, the recording confirming hole 23 is closed and the verification confirming hole 24 is open, this indicates a direct recording mode. It can seen from the Table 2 that the number of driving modes selectable by a user differs depending on whether the open-close confirming hole 2 is opened or closed.

When the disc 1 does not have a release experience, as shown in FIG. 9, the open-close confirming hole 22 is maintained in a closed state by the stopper 27. In this case, since a driving of the rotary slider 26 is limited by the stopper 27, a user can select only the recording prohibition and the direct recording mode as a driving mode of the disc 1. For instance, when the annular hole 26a in the rotary slider 26 is opposed to the verification confirming hole 24 to thereby open the verification confirming hole 24 and the recording confirming hole 23 is closed, represents a direct recording mode. If a user rotates the rotary slider 26 clockwise such that the annular hole 26a is opposed to the recording confirming hole 23, it is converted into a recording prohibition mode. Also, a conversion from the recording prohibition mode into the direct recording mode becomes possible. However, a counter-clockwise driving of the rotary slider 26 in the case of the direct recording mode and a clockwise driving thereof in the case of the recording prohibition mode is restrained by the stopper 27. Accordingly, a user fails to make a conversion when the recording confirming hole 23 and the verification confirming hole 24 are opened, which represents a verification preceding recording mode.

Figure 10:
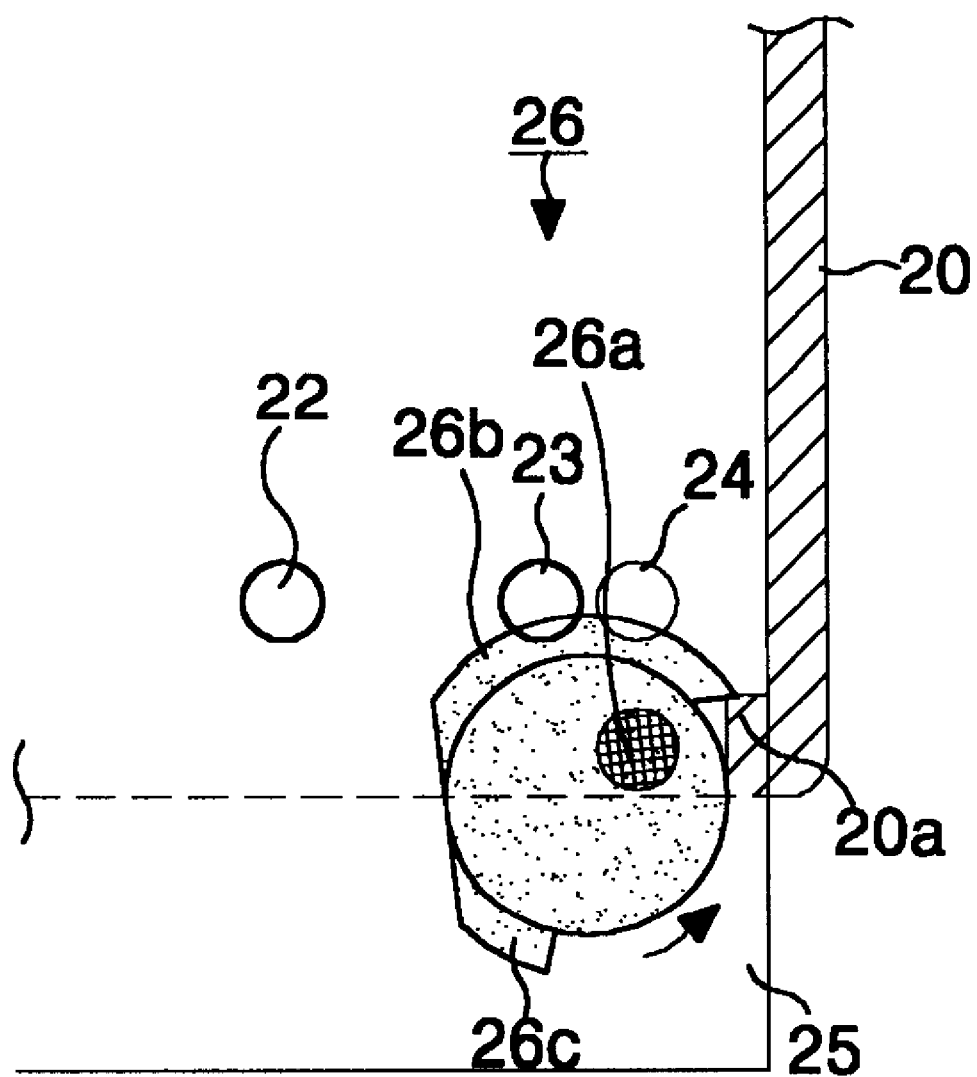
FIG. 10 shows an operation procedure of the rotationally driving slider when a holder is released from the cartridge body in FIG. 6.

When the disc has a release experience, as shown in FIG. 10 and FIG. 11, the stopper 27 is removed such that the open-close confirming hole 22 maintains an open state. In this case, the rotary slider 26 can be rotated 360° C., so that a user can select the recording prohibition mode, the direct recording mode or the verification preceding recording mode as a driving mode of the disc 1. In order to take out the disc 1, as shown in FIG. 10, the holder 25 must be separated from the cartridge body 20. When the holder 25 is separated in the direct recording mode as shown in FIG. 9, the first blade 26b contacts the jaw 20a of the cartridge body 20 to rotate the rotary slider 26 clockwise. Such a rotated state of the rotary slider 26 is maintained even when the released disc 1 is again received within the cartridge body 20 and thereafter the holder 25 is mounted again.

Accordingly, in a disc cartridge indicating the direct recording mode, when the disc 1 has a release experience, both the recording confirming hole 23 and the verification confirming hole 24 are closed by rotation of the rotary slider 26 to thereby be automatically converted into the verification preceding recording mode. The purpose of this feature is to permit an automatic conversion into the verification preceding recording mode as long as there is not a user's special request, because an information recording face of the disc 1 more likely to be contaminated or damaged if the disc 1 has had a release experience. If a user does not want a verification preceding process even though the disc 1 has a release experience, he can rotate the slider 26 to be converted into the direct recording mode. In the recording prohibition mode as shown in FIG. 9, when the holder 25 is released, the first blade 26b of the rotary slider 26 does not contact the jaw 20a in the cartridge body 20. In other words, when the disc 1 has a release experience in a state in which the rotary slider 26 indicates the recording prohibition mode, the rotary slider 26 maintains a recording prohibition mode. When the disc 1 has a release experience, the stopper 27 is removed so as not to restrain a rotational driving of the rotary slider 26.

A user can make a conversion into a desired recording mode in the verification preceding mode, the recording prohibition mode and the direct recording mode by rotating the rotary slider 26 clockwise or counter-clockwise as shown in FIG. 11. In FIG. 11, the open-close experience hole 22 maintains a open state. A state in which all of the recording confirming hole 23 and the verification confirming hole 24 are closed, represents a verification preceding confirming mode. A state in which the recording confirming hole 23 is opened and the verification confirming hole 24 is closed, represents a recording prohibition mode. A state in which the recording confirming hole 23 is closed and the verification confirming hole 24 is opened, represents a verification preceding recording mode.

Figure 12:
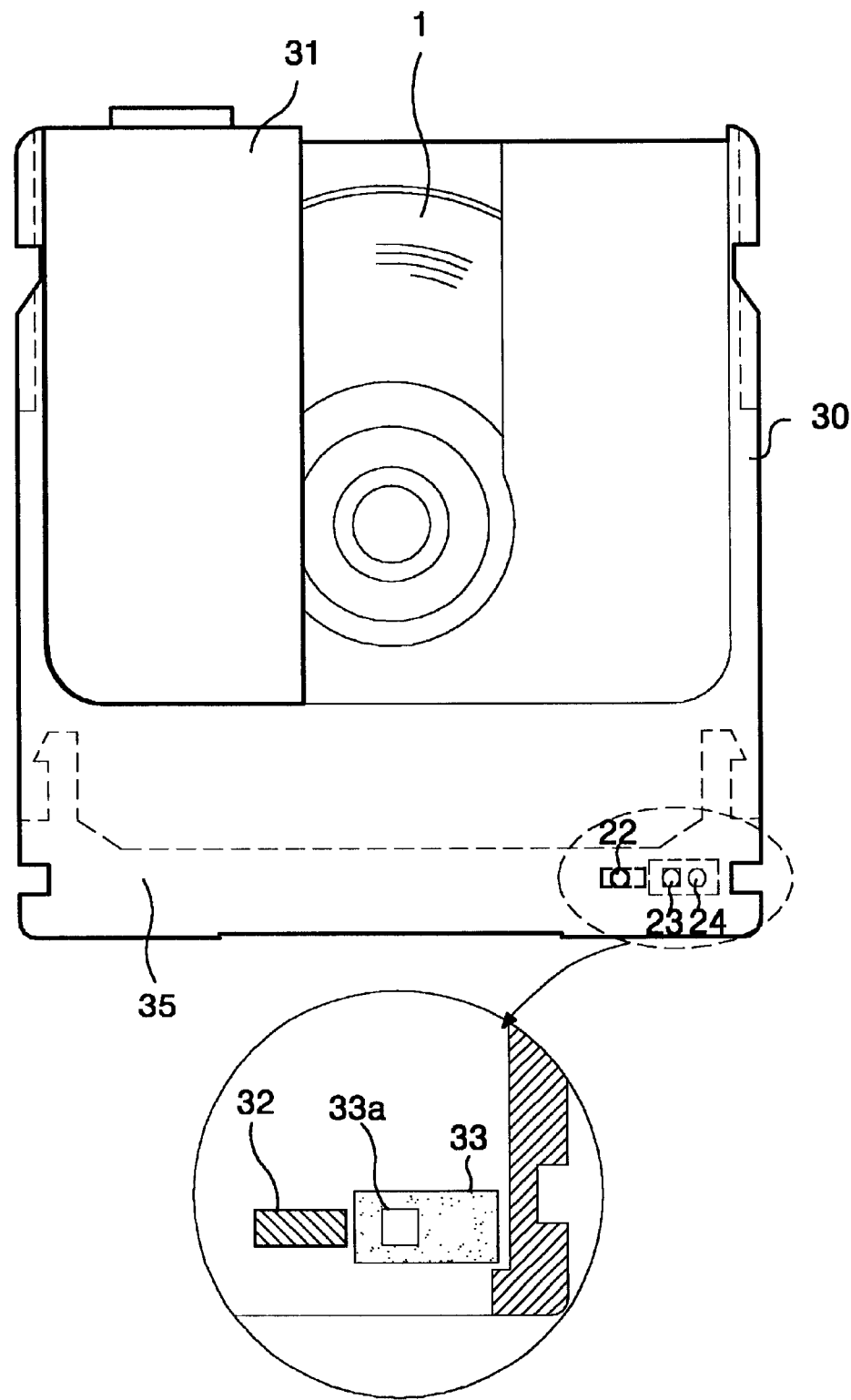
FIG. 12 is a plan view showing the structure of a disc cartridge according to a fourth embodiment of the present invention.

Referring now to FIG. 12, there is shown a disc cartridge according to a fourth embodiment of the present invention. The disc cartridge includes a cartridge body 30 for receiving the disc 1, a open-close confirming hole 22, a recording confirming hole 23 and a verification confirming hole 24 for indicating a driving mode of the disc 1, a holder 35 mounted to the cartridge body 30 such that it can be inserted and released, and a slider 33 installed to the holder 35 in such a manner to be linearly driven.

In the disc cartridge shown in FIG. 12, the cartridge body 30 is provided with an opening such that an optical pickup can access the disc 1, and this opening is opened or closed by a movement of a shutter 31. At the bottom of the cartridge body 30, an inserting hole is provided to insert the disc 1 and the holder 35 is mounted such that it can be inserted and released in opposition to the inserting hole. The open-close confirming hole 22, the recording confirming hole 23 and the verification confirming hole 24 have the same function as those shown in FIG. 6. The open-close confirming hole 22 is opened and closed by a stopper 32, and the recording confirming hole 23 and the verification confirming hole 24 is opened and closed by the slider 33. The slider 22 enlarged within a circle in FIG. 12 is linear-drivably installed to the holder 35. The slider 33 is responsible for opening and closing the recording confirming hole 23 and the verification confirming hole 24 like the rotary slider 26 shown in FIG. 6 by the linear driving thereof. The slider 33 is provided with a square hole 33a for opening the recording confirming hole 23 or the verification confirming hole 24. A user linearly drives the slider 33 to convert a driving mode of the disc 1. In this case, the number of driving modes that can be converted by a user becomes different in accordance with whether the open-close confirming hole 22 is opened or closed, that is, whether or not the disc 1 has a release experience as described in the above Table 2. A closed or opened state of the open-close confirming hole 22, the recording confirming hole 23 and the verification confirming hole 24 according to each driving mode is as described in Table 2 and shown in FIG. 13.

Figure 13:
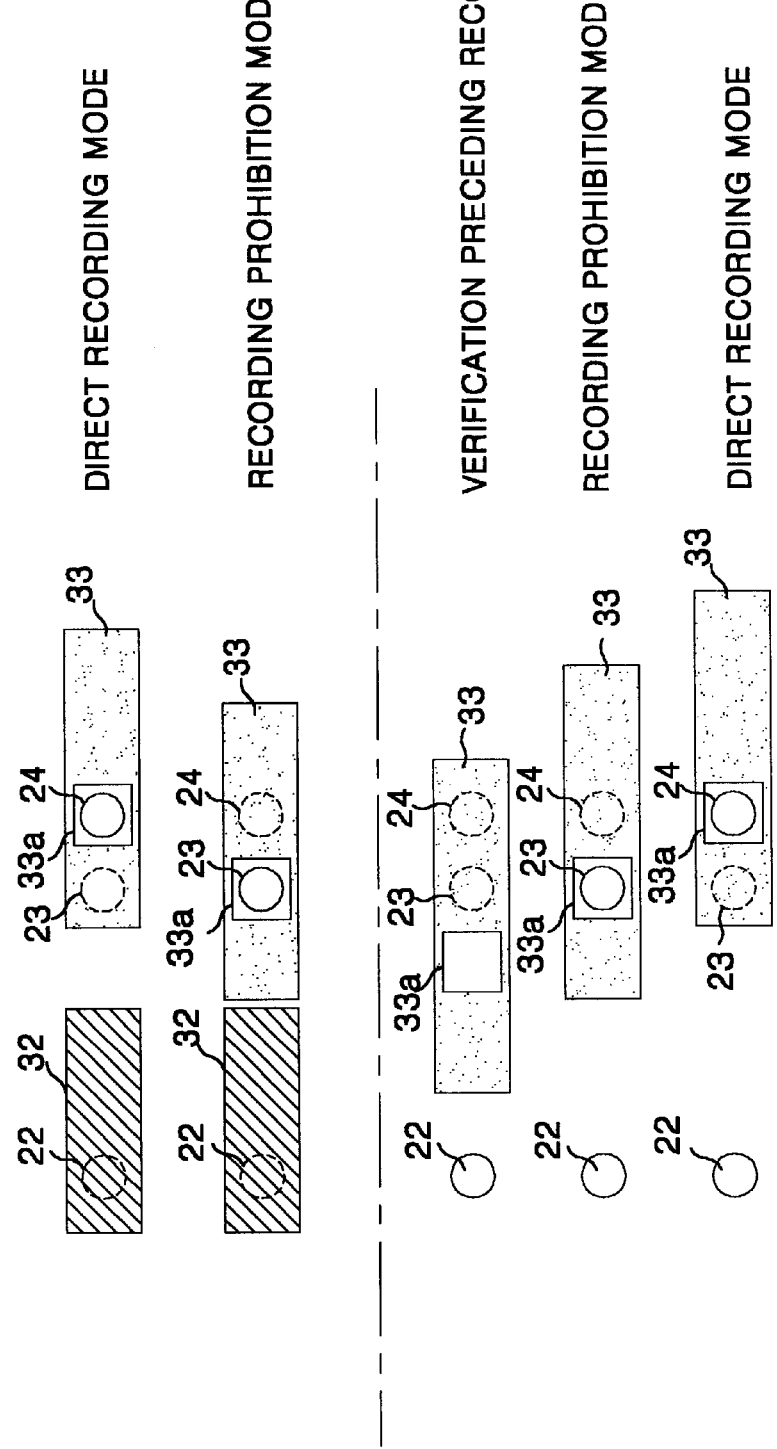
FIG. 13 represents a recording mode change procedure using the slider in FIG. 12.

In FIG. 13, when the disc 1 has a release experience, the open-close confirming hole 22 is in a closed state as a result of the stopper 32. In this case, since a linear driving of the slider 33 is limited by the stopper 32, a user can select only the recording prohibition mode and the direct recording mode as driving modes for the disc 1. For instance, a state in which the square hole 33a in the slider 33 is opposed to the verification confirming hole 24 to open the verification confirming hole 24 and to close the recording confirming hole 23, represents a direct recording mode. In this case, a user drives the slider 33 linearly such that the square hole 33a is opposed to the recording confirming hole 23, thereby making a conversion into the recording prohibition mode. Also, a conversion from the recording prohibition mode into the direct recording mode becomes possible. On the other hand, since a linear driving of the slider 33 is limited by the stopper 32, a user fails to make a conversion into a verification preceding recording mode, that is, a state in which all of the verification preceding recording mode.

Meanwhile, the stopper 32 is removed when the disc 1 has a release experience, so that a user can drive the slider 33 to select the recording prohibition mode, the direct recording mode or the verification preceding recording mode. In this case, the open-close confirming hole 22 maintains the open state. A state in which all of the recording confirming hole 23 and the verification confirming hole 24 are closed, represents a verification preceding recording mode. A state in which the recording confirming hole 23 is opened and the verification confirming hole 24 is closed, represents a recording prohibition mode. A state in which the recording confirming hole 23 is closed and the verification confirming hole 24 is opened, represents a verification preceding recording mode.

Figure 14:
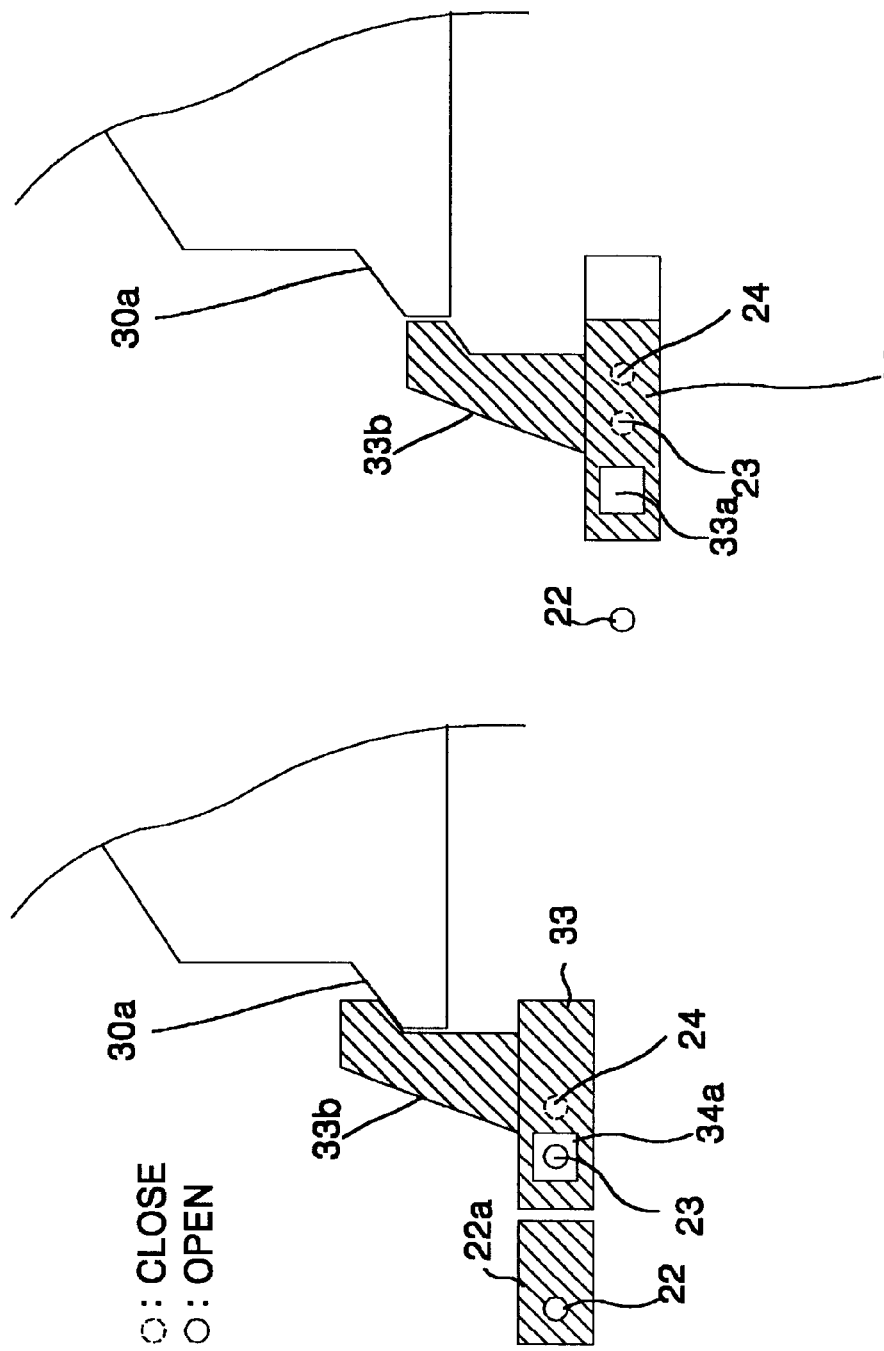
FIG. 14 shows an operation procedure of the rotationally driving slider when a holder is released from the cartridge body in FIG. 12.

If a slope 30a is provided at the inner wall of the cartridge body 20 and a protrusion 33b having a slope corresponding to the slope 30a is additionally formed at the slider 34 as shown in FIG. 14, then an automatic conversion into the verification preceding recording mode becomes possible upon release of the holder 35. More specifically, when a driving mode prior to a release of the holder 35 is the direct recording mode, a slope of the protrusion 33a in the slider 33 contacts a slope 30a of the cartridge body 30. The stopper 32 is removed when the holder 35 is released, so that the slider 33 is automatically moved to the left by the slope 30a of the cartridge body 30. Accordingly, if the released holder 35 is again mounted, then both the recording confirming hole 23 and the verification confirming hole 24 are closed by the moved slider 33 to thereby be automatically converted into the verification preceding recording mode. On the other hand, when a driving mode prior to a release of the holder 35 is the recording prohibition mode, the protrusion 33b in the slider 33 does not contact the slope 30a of the cartridge body 30 upon release of the holder 35. Accordingly, if the holder 35 is again mounted, then a state of recording prohibition mode prior to a release thereof is maintained at it is.

Figure 15:
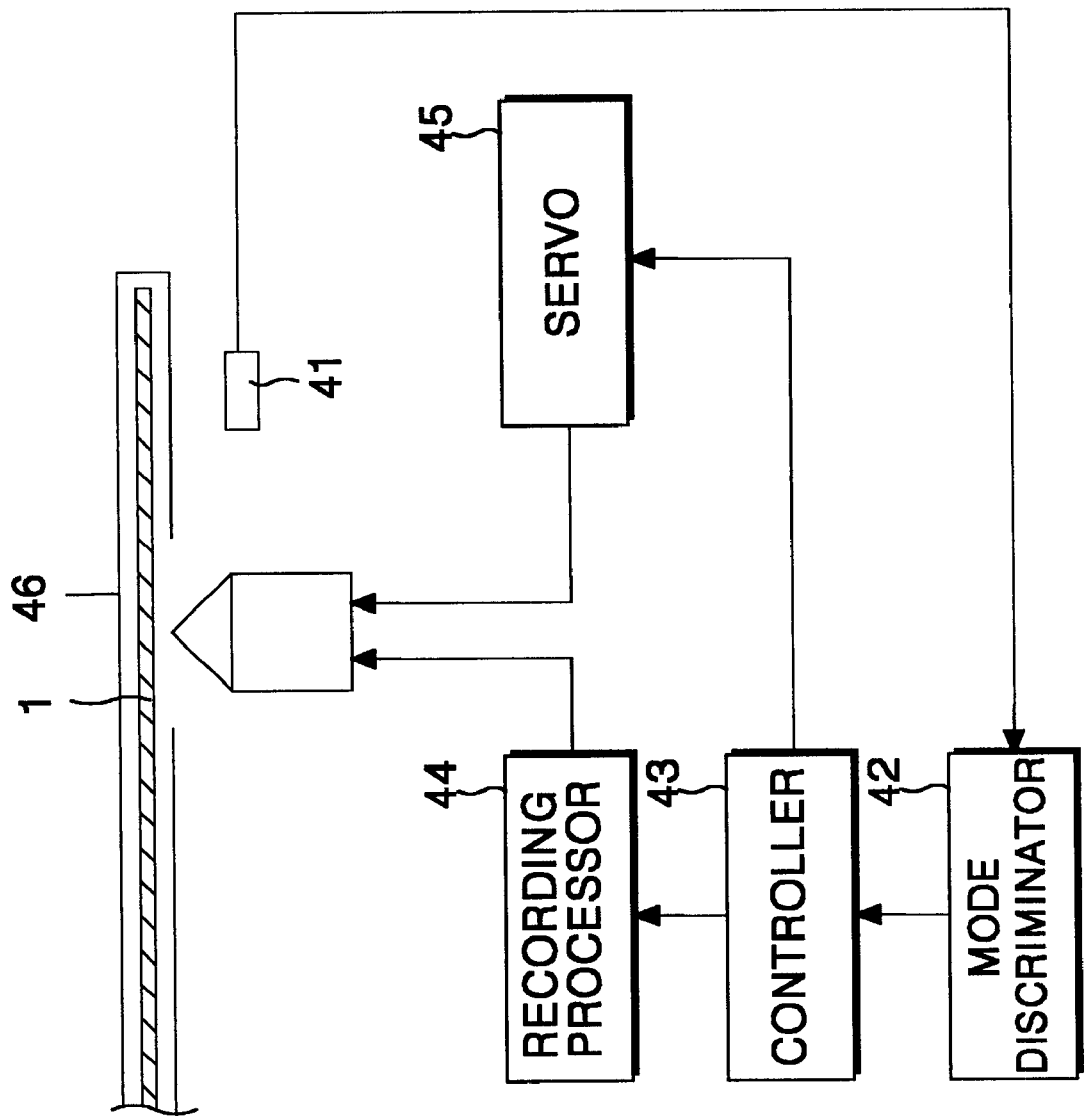
FIG. 15 is a block diagram showing the configuration of a disc recording/reproducing apparatus according to an embodiment of the present invention.

Referring now to FIG. 15, there is shown an optical recording/reproducing apparatus employing the above-mentioned disc cartridges. The optical recording/reproducing apparatus includes a sensor 41 for sensing whether functional holes defined in a disc cartridge 46 is opened or closed, a mode discriminator for judging a driving mode in accordance with a sensing signal inputted from the sensor 41, a controller 43 for controlling a recording processor 44 and a servo 45 in accordance with a driving mode determined at the mode discriminator 42, a recording processor 44 for generating a laser driving signal according to a recording data, an optical pickup 40 for accessing a disc 1 in the laser driving signal from the recording processor, and a servo for controlling the optical pickup 40 under control of the controller 43.

In FIG. 15, the disc 1 loaded into the optical recording/reproducing apparatus includes a direct recording mode, a recording prohibition mode and a verification preceding recording mode as mentioned above. The sensor 41 senses whether the functional holes defined in the loaded disc cartridge 46 are opened or closed to output a sensing signal to the mode discriminator 42. In this case, any sensors capable of sensing whether the functional holes are opened or closed, such as a switch being physically contacted to the functional holes to be turned on or off and an optical sensor for optically accessing the functional holes, etc. can be used as the sensor 41. The mode discriminator 42 judges a driving mode set to the disc cartridge 46 with the aid of the sensing signal inputted from the sensor 41. In this case, the mode discriminator 42 determines any one of the direct recording mode, the recording prohibition mode and the verification preceding recording mode. The controller 43 controls the recording processor 44 in accordance with a driving mode determined at the mode discriminator 42. When a direct recording mode is determined at the mode discriminator 42, the controller 43 controls the recording processor 44 to perform a recording operation according to an input recording data. The recording processor 44 outputs the laser driving signal according to the input recording data to the optical pickup 40. The optical pickup 40 records an information onto the disc 1 in accordance with the laser driving signal inputted from the recording processor 44. The servo 45 controls tracking and focussing operation under control of the controller 43. On the other hand, when a recording prohibition mode is determined at the mode discriminator 42, the controller 43 performs such a control operation that the recording processor 44 is not driven. In this case, the optical pickup 40 can perform only a reproducing operation. Also, when a verification preceding recording mode is determined at the mode discriminator 42, the controller 43 controls the recording processor 44 to thereby perform a recording operation after preceding a verification process by means of the optical pickup 40.

As described above, the disc cartridge according to the present invention makes an automatic conversion into a verification preceding recording mode when the disc has a release experience, and allows a user to make a mode conversion when he does not want the verification preceding recording mode. In other words, the disc cartridge according to the present invention provides various driving modes at a user's request. Also, the disc cartridge according to the present invention limits a driving mode conversion when the disc does not have a release experience, and makes an automatic conversion into the verification preceding recording mode only when the disc has a release experience in the direct recording mode. In other words, the disc cartridge according to the present invention permits a user to select a driving mode efficiently. Accordingly, a user can use a disc stabbly even when he does not know complex functions of the functional holes. Furthermore, the disc recording/reproducing method and apparatus employing the disc cartridge according to the present invention senses a driving mode in accordance with whether the functional holes are opened or closed, so that it can be operated in a driving mode set to the disc cartridge.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A disc cartridge, having:
   mode selecting means for selecting any one of a recording prohibition mode, a verification preceding recording mode and a direct recording mode,
   wherein any one of the verification preceding recording mode and the direct recording mode is selectable by a user from an outside of the disc cartridge when a disc is not in the recording prohibition mode.

2. The disc cartridge as claimed in claim 1, further comprising:
   a cartridge body within which a disc is received, said cartridge body is provided with a receiving hole for the disc;
   a holder installed to the cartridge body such that it can open and close the disc receiving hole.

3. The disc cartridge as claimed in claim 2, wherein said mode selecting means comprises:
   a first functional hole for indicating whether or not the disc should precede a verification thereof;
   a second functional hole for indicating whether or not the disc should prohibit a recording thereof; and a sliding member for selectively opening and closing the first and second functional holes.

4. The disc cartridge as claimed in claim 3, wherein each of said mode can be sequentially selected in accordance with a driving of the sliding member.

5. The disc cartridge as claimed in claim 3, wherein said first and second functional holes are defined at the cartridge body, and said sliding member is drivably installed to the holder.

6. The disc cartridge as claimed in claim 5, wherein said disc cartridge is automatically converted into the verification preceding recording mode by the sliding member linked to the holder when the disc has a release experience in that the disc is removed from the cartridge.

7. The disc cartridge as claimed in claim 2, wherein said mode selecting means comprises:

a third functional hole for indicating whether or not the disc has a release experience that it had been released from;

a first functional hole for indicating whether or not the disc should precede a verification;

a second functional hole for indicating whether or not the disc should prohibit a recording thereof; and a sliding member for selectively opening and closing the first and second functional holes; and a stopping member for closing the third functional hole and for limiting a driving of the sliding member.

8. The disc cartridge as claimed in claim 7, wherein said first to third functional holes are defined at the cartridge body, said sliding member to the holder, and the stopping member is provided at the holder.

9. The disc cartridge as claimed in claim 7, wherein each of said modes can be sequentially selected in accordance with driving of the sliding member.

10. The disc cartridge as claimed in claim 8, wherein said sliding member is installed in such a manner to be linearly driven.

11. The disc cartridge as claimed in claim 8, wherein said sliding member is installed in such a manner to be rotatively driven.

12. The disc cartridge as claimed in claim 8, wherein said stopper member is removed upon release of the holder.

13. The disc cartridge as claimed in claim 7, wherein said disc cartridge is automatically converted into the verification preceding recording mode by the sliding member linked to the holder when the disc has the release experience in the direct recording mode.

14. The disc cartridge as claimed in claim 7, wherein only any one of the recording prohibition mode and the direct driving mode can be selected when the disc does not have the release experience.

15. A method of recording and reproducing information on and from a disc, comprising the steps of:

confirming a driving mode of a disc cartridge when the disc cartridge including a recording prohibition mode, a verification preceding recording mode and a direct recording mode is loaded, wherein any one of the verification preceding recording mode and the direct recording mode is selectable by a user from an outside of the disc cartridge when a disc is not in the recording prohibition mode; and driving a disc received within the disc cartridge in accordance with a mode confirmed in the confirming step.

16. The method as claimed in claim 15, wherein said modes are confirmed by sensing whether at least two functional holes defined at the disc cartridge are opened or closed.

17. The method as claimed in claim 15, wherein only a reproducing operation of the disc can be performed when the recording prohibition mode is confirmed, a recording process can be performed after preceding a verification process of the disc when the verification preceding recording mode is confirmed, and a recording operation can be performed directly when the direct recording mode is confirmed.

18. A disc recording/reproducing apparatus, comprising:

sensing means for sensing a current mode when a disc cartridge including a recording prohibition mode, a verification preceding recording mode and a direct recording mode is loaded, wherein any one of the verification preceding recording mode and the direct recording mode is selectable by a user from an outside of the disc cartridge when a disc is not in the recording prohibition mode;

recording/reproducing means for performing a recording and reproducing operation of the disc received within the disc cartridge;

mode discriminating means for judging a disc driving mode in accordance with a sensing signal inputted from the sensing means; and control means for controlling the recording/reproducing means in a driving mode determined at the mode discriminating means.

19. The disc recording/reproducing apparatus as claimed in claim 18, wherein said sensing means confirms said modes by sensing whether at least two functional holes defined at the disc cartridge are opened or closed.

20. The disc recording/reproducing apparatus as claimed in claim 18, wherein said control means permits only a reproducing operation of the disc to be performed when the recording prohibition mode is confirmed at the mode discriminating means, it permits a recording process to be performed after preceding a verification process of the disc when the verification preceding recording mode is confirmed at the mode discriminating means, and it permits a recording operation to be performed directly when the direct recording mode is confirmed at the mode discriminating means.

21. A disc cartridge, having:

mode selecting means for selecting any one of a recording prohibition mode, a verification preceding recording mode and a direct recording mode, wherein any one of the verification preceding recording mode and the direct recording mode is selectable by a user when a disc is not in the recording prohibition mode;

a cartridge body within which a disc is received, said cartridge body is provided with a receiving hole for the disc; and a holder installed to the cartridge body such that it can open and close the disc receiving hole;

wherein the mode selecting means includes:

a third functional hole for indicating whether or not the disc has a release experience in that it had been released from the cartridge body, a first functional hole for indicating whether or not the disc should precede a verification, a second functional hole for indicating whether or not the disc should prohibit a recording, a sliding member for selectively opening and closing the first and second functional holes, and a stopping member for closing the third functional hole and for limiting a driving of the sliding member.

* * * * *